United States Patent [19]

Fürstenberg et al.

[11] 4,107,910
[45] Aug. 22, 1978

[54] DOUBLE TWISTING MACHINE

[75] Inventors: Joachim Fürstenberg, Aichelberg; Dietmar Hencke, Butzbach, both of Germany

[73] Assignee: LTG Lufttechnische GmbH, Stuttgart, Germany

[21] Appl. No.: 728,968

[22] Filed: Oct. 4, 1976

[30] Foreign Application Priority Data

Oct. 2, 1975 [DE] Fed. Rep. of Germany ....... 2544141

[51] Int. Cl.² .................... D01H 11/00; D01H 13/30
[52] U.S. Cl. ..................................... 57/34 R; 57/56; 57/58.49; 57/108; 57/156
[58] Field of Search ................... 57/1 R, 34 R, 58.49, 57/58.7, 58.83, 58.86, 56, 106, 107, 108, 156; 15/300 R, 301 R, 312 R

[56] References Cited

U.S. PATENT DOCUMENTS

| 2,488,934 | 11/1949 | Rayburn | 57/56 X |
|---|---|---|---|
| 3,319,410 | 5/1967 | Franzen | 57/34 R |
| 3,374,618 | 3/1968 | Franzen | 57/56 |
| 3,410,070 | 11/1968 | Denis | 15/301 X |
| 3,412,545 | 11/1968 | Lippuner | 57/56 |
| 3,429,113 | 2/1969 | Nimtz et al. | 57/34 R |
| 3,857,228 | 12/1974 | Nakahara | 57/56 |
| 3,973,381 | 8/1976 | Teranishi | 57/56 X |

FOREIGN PATENT DOCUMENTS

| 244,997 | 5/1963 | Australia | 57/56 |
|---|---|---|---|
| 549,720 | 12/1942 | United Kingdom | 57/34 R |
| 788,041 | 12/1957 | United Kingdom | 15/301 |

*Primary Examiner*—Donald Watkins
*Attorney, Agent, or Firm*—Edwin E. Greigg

[57] ABSTRACT

A double twisting machine is equipped with air flow control devices which create preferred conditions in the vicinity of each twisting station and, particularly, in the immediate vicinity of the twisting mechanism and the thread balloons. Pre-conditioned air, adjusted for temperature and humidity, is delivered through a nozzle located above each twisting spindle and is directed generally to the location of the thread guide loop. The protective container for the bobbin has a lower opening which permits the air flowing into the container from the top to emerge below where an exhaust conduit carries it away. A coaxial shroud surrounds the protective container and forms an annular air passage through which conditioned air may flow in both directions.

14 Claims, 2 Drawing Figures

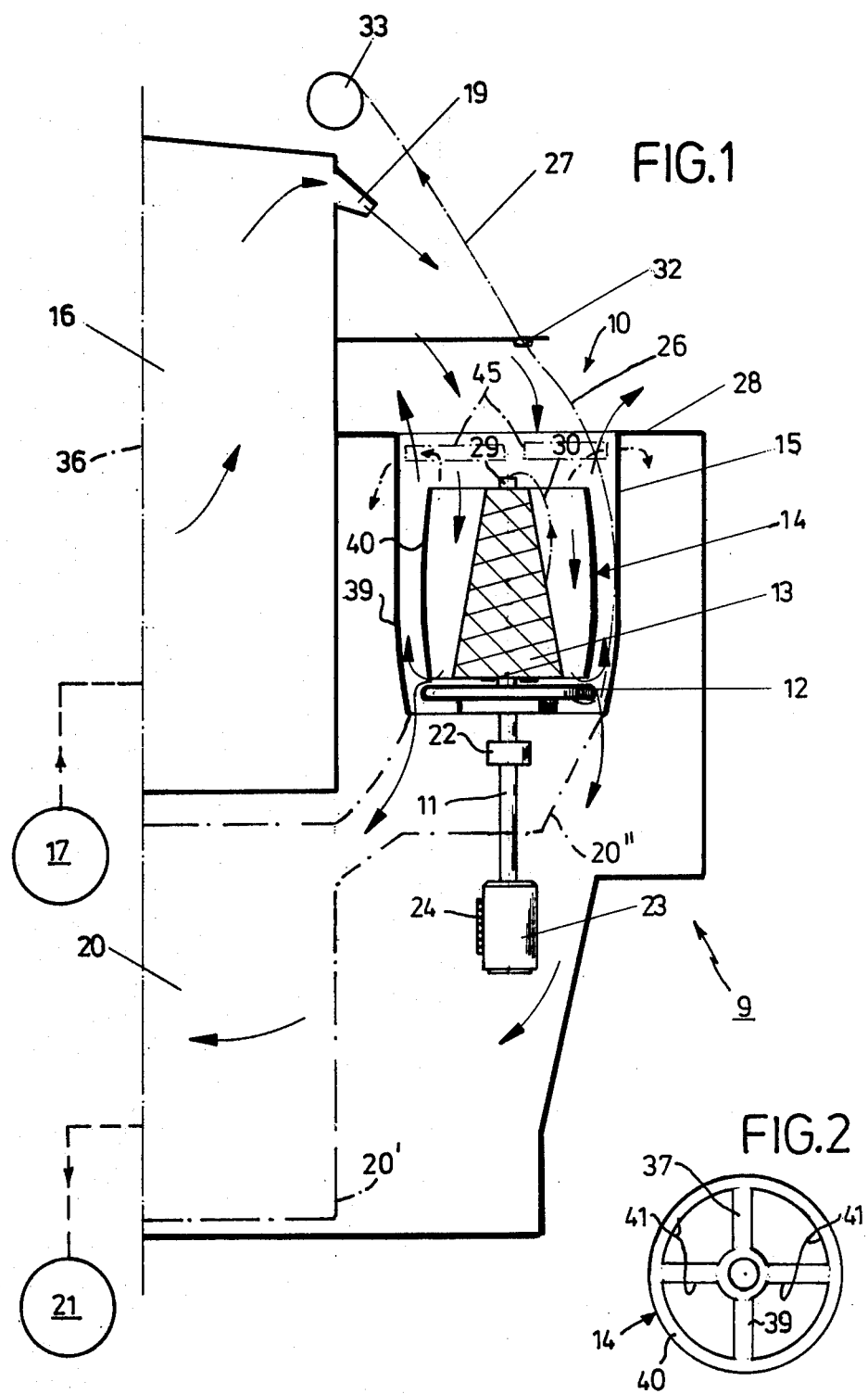

DOUBLE TWISTING MACHINE

BACKGROUND OF THE INVENTION

The invention relates to a double twisting machine in which each twisting station has at least one protective container including therein a payoff bobbin and, located between the protective container, a rotatably driven turntable for providing thread rotation.

Double twisting machines of this type develop substantial amounts of heat so that, in an installation including many stations, even an air conditioning unit is not capable to provide the optimum conditions for the ambient air at the twisting stations. It is known to take measures in order to influence the air flow in the vicinity of the twisting station, for example to reduce the air resistance of the outer thread region or to draw off flying fibers (for example DT-Gbm 1,886,448, Fr-PS 1,378,696, DT Offenlegungsschrift 1,510,510, and DT-AS 1,267,153), however these mechanisms are not related to the maintenance of the desired conditions of the air in the vicinity of the twisting station.

OBJECT AND SUMMARY OF THE INVENTION

It is a principal object of the invention to provide a double twisting machine in which optimum conditions of the ambient air exists at or near each twisting station. These conditions may be, for example, air temperature and humidity. This and other objects are attained according to the invention by providing a double twisting machine in which the protective container has at least one air opening in its lowermost regions and provides further that there is located an air nozzle externally of the protective container and of the outermost extent of the thread balloon, where this nozzle is supplied with conditioned air from an appropriate source and directs that air into the upper opening of the protective container.

Due to the features of the invention, at least a substantial portion of the conditioned air, which is adjusted with respect to temperature and humidity for optimum operational conditions of the twisting machine, is at all times directed to and flows into the protective container which therefore always includes conditioned air. Thus, at least the payoff bobbin and the thread in the inner portions of the thread balloon which are contained within the protective container are always in precisely conditioned air which is adjusted for the optimum technological conditions for thread preparation and processing. As a result of the presence of the conditioned air within the protective container, the number of thread breakages is reduced and other technological advantages are obtained.

The invention provides that, preferably, the transport of the air through the protective container is effected at least partially by the turntable. The turntable rotates the air adjacent thereto and flings it outwardly so that the vacuum which thereby occurs is transmitted into the protective container through the at least one bottom air passage therein so that the turntable constantly aspirates air out of the protective container and transports it by centrifugal force to the outside. The rotation of the air can be further enhanced by the threads of the inner and/or outer thread balloons. It is possible to provide the entire or substantial portions of the air transport by means of the turntable, but the transport of air through the protective container from the top to the bottom can also be performed exclusively or substantially by other suitable steps, for example the aspiration of air in the vicinity of the turntable, direct injection of air into the container, etc., and under such conditions the at least one air outlet may be located in the wall of the container but adjacent its bottom.

Preferably, the supply of air to the interior of the protective container takes place by blowing the air into the vicinity of the top of the container in a region which still experiences the reduced pressure or vacuum extending into the container from below.

Alternatively, it would be suitable to direct air directly into the container, especially if this is possible or permissable through the extent of the outer thread balloon. It could also be provided to blow the air only into the draft occurring on top of the protective container, preferably into the vicinity of the thread guide loop which is located centrally above the protective container because, in that location, the outer portions of the thread balloon have their smallest translational velocity, which is favorable for the passage of air through the outer thread balloon. The direction and the rate of the air to be ejected from the nozzle or nozzles is so chosen that the ambient air prevailing in the protective container is entirely or at least substantially defined by the air actually being delivered by the nozzle.

In a preferred embodiment, the invention provides a coaxial shroud surrounding the protective container and the turntable with clearance. This shroud may be open both on top and on the bottom.

Preferably, it is provided that the blowing air does not pass the space between the shroud and the protective container from top to the bottom but rather that some of the air which emerges from the bottom of the protective container is diverted upwardly past the shroud and flows out at the top while another part of it flows downwardly along portions of the shroud. However, in many cases it is also suitable that the intermediate space between the shroud and the protective container is also supplied with compressed air from the top in such a manner that the blowing air flows from top to bottom through the shroud, in the opposite direction of the motion of the thread in the outer thread balloon so that the entire conditioned air fed into the interior of the protective container and into the annular volume as between the container and the shroud flows out at the bottom of the shroud, preferably at its lower end. In some cases, it may be provided, however, that the air flows out of an opening in the shroud and, in that case, the lower end of the shroud may be closed. Preferably, it is provided that the shroud extends somewhat beyond the top of the protective container and, as a result, even for relatively small amounts of conditioned air, the air flowing into the container is practically entirely conditioned air coming directly from the nozzle and, possibly, partially air emerging from the top of the shroud, but still of good quality.

In a further embodiment, the bottom of the shroud is connected to an exhaust conduit continually receiving air from the interior of the shroud. The air reaching the exhaust conduit may preferably be exclusively that air which has previously flowed through the interior of the container and it is especially advantageous to so choose the reduced pressure within the exhaust conduit that only a portion of the air previously passing through the container flows into the exhaust conduit while the remainder of the conditioned air previously passing the container flows through the shroud in the upper direction and is exhausted from the top of the shroud to the atmosphere so that no air coming from the volume above the shroud can enter it. In that manner, the air flow rate required to produce conditioned air within the interior of the protective container is reduced and furthermore the air flowing into the space between the shroud and the container is always conditioned air. In this manner, the required power of the source of reduced pressure connected to the exhaust conduit is substantially reduced and a portion of the conditioned air which has passed through the protective container and through the shroud is exhausted at the top into the atmosphere and creates there a somewhat conditioned air space which has a favorable effect on the overall ambient air conditions above the twisting stations. In many cases, it may be suitable to choose the suction power of the exhaust conduit so great that the entire air flowing through the protective container is induced into the exhaust conduit, so that no air remains to flow upwardly out of the station.

The forced exhaust of air at the bottom of the shroud has several advantages. For example, this forced exhaust can enhance the upper aspiration of air into the protective container and thus can increase the air transport capacity of the turntable. Again, the forced exhaust at the bottom can be used to adjust the amount of air flowing through the container for a given construction of the turntable without requiring changes in that construction.

In some cases, it may be suitable to provide air transport vanes on the turntable or to affix to it an air transport wheel to increase the air flow rate. Normally however, such additional mechanisms are not necessary and may be disadvantageous because they tend to increase the required drive power and/or the expense of manufacture. A significant advantage of connecting the exhaust conduit directly to the shroud is that at least a substantial percentage of the parasitic heat generated by the drive of the twisting spindle can be carried away with the exhaust air so that this heat does not become an additional load for the air conditioning system which services the space in which the machine is located. Alternatively, it may permit to choose the capacity of this air conditioning system to be somewhat smaller than otherwise required and, in many cases, such air conditioning may be entirely dispensed with, especially if the micro-climate spaces in the vicinity of each twisting station, as provided by the invention, are sufficient for the purpose.

In order to further enhance the transport of heat through the exhaust conduit, it is advantageous to locate some of the drive portions of the turntable within the exhaust conduit so that any heat they generate is immediately carried away in the exhaust air. When the drive mechanism uses tangential belts to drive twisting spindles fixedly attached to the turntables, the spindles and the drive belt or the portion of the drive belt in contact with the spindles can preferably be located within the exhaust conduit. A single exhaust channel or conduit may be associated with a predetermined plurality of twisting stations or with all of the twisting stations on both long sides of such a machine. Preferably, the entire shroud can extend into the exhaust conduit so that any heat generated on it by thread friction is at least partially carried away by the effluent air. Another advantage of exhausting the air at the bottom of the shroud is that at least a portion of the dust or the flying fibers which are generated during the twisting are carried away together with the effluent air. Furthermore, the possibility to provide precisely adjusted humidity of the air within the protective container and in the interior space between the container and the shroud causes a substantial reduction of dust and fiber generation.

Furthermore, the invention permits operation at very high turntable speeds which can, at least in some cases, be substantially greater than previously attainable speeds.

Advantageously, all the air nozzles of the double twisting machine can be connected to one common central air distribution manifold of the machine.

However, other types of air distribution for the nozzles are possible, for example a plurality of air channels, tapped off lines, etc.

The invention will be better understood as well as further objects and advantages thereof become more apparent from the ensuing detailed description of a preferred embodiment taken in conjunction with the drawing.

BRIEF DESCRIPTION OF THE DRAWING

FIG. 1 of the drawing is a partially schematic, sectional, elevational view of a double twisting machine according to the invention, shown in simplified form; and FIG. 2 is a bottom view of the protective container in the twisting machine according to the invention.

DESCRIPTION OF THE PREFERRED EMBODIMENT

Turning now to FIG. 1, there is illustrated one side of a double twisting machine 9 which comprises a row of identical twisting stations extending vertically into the plane of the figure of which there is illustrated a single twisting station 10. The station includes a drive spindle 11, a turntable 12 driven thereby and a payoff bobbin 13 all of which are shown in perspective. Surrounding the bobbin is a protective container 14 and a shroud 15 surrounding the container 14 with clearance. The other side of the machine could have an identical row of twisting stations, in which case the line 36 would be a longitudinal central plane of the machine which represents a symmetry plane with respect to the twisting stations, an air supply channel 16 and an air exhaust channel 20. In a manner not illustrated, each side of the machine may actually have two rows of twisting stations, for example on two floors.

The machine 9 has an air supply channel 16 which extends along all twisting stations and which, as indicated schematically, provides air from an air supply device, for example a fan 17, as prepared and conditioned by an air conditioning unit, not shown, and expelled by means of blow nozzles 19. The conditioned air is air whose temperature and humidity have been adjusted to correspond with the optimum conditions for the processing of the threads to be twisted. The machine further includes an exhaust channel 20 which, as indicated schematically, is connected to a source of reduced pressure 21 and which also extends along all of the twisting stations of the machine 9.

Each twisting station 10 has a drive spindle 11 rotating in a stationary bearing 22 and carrying at its lower extremity a whorl 23. All of the whorls 23 of a particular row of twisting stations are driven by a common tangential drive belt 24. The belt 24 and all of the drive spindles 11 as well as the stationary bearings 22 are located within the exhaust channel 20. At each twisting location 10, the shroud 15, which is placed in rotational symmetry with respect to the spindle, extends into the exhaust channel 20. The upper end of the shroud 15 is attached to the top 28 of the exhaust channel in airtight manner. The shroud 15, which is coaxial to the rotational axis of the drive spindle 11, also serves to define the outer limits of the thread balloon 26. Any heat generated by the friction of the thread against the shroud 15 is carried off by the exhaust air passing its outer wall.

As usual, the protective container 14 is mounted rotatably with respect to the spindle 11 and is prevented from rotation by permanent magnets so as to maintain it stationary. The protective container 14 carries the payoff bobbin 13 extending upwardly approximately over its whole length from which the threads to be twisted are taken, thereby forming, at first, an interior thread balloon 30. The thread from the interior thread balloon 30 travels into the hollow top 29 of the spindle and through the spindle to the turntable 12 from which it passes through the substantially radial thread channel in the turntable to the space created between the protective container 14 and the shroud 15 where it forms the outer thread balloon 26 whose radial extent is limited by the shroud 15. Subsequently, the thread passes through a stationary thread guide loop 32 to a wind-up spool 33, for example a cross-wound spool, driven in a manner not shown, and subjected, if necessary, to appropriate lateral guidance.

The bottom 37 of the protective container 14 has at least one air outlet, and preferably several identical air outlets separated by identical intermediate bridges. FIG. 2 illustrates one exemplary embodiment of the bottom 37 of the protective container 14, illustrating four equal segmental air outlets 41 which are separated by radial bridges 39 that connect the inner ring of the bottom 37 with the exterior surface 40.

Although the surface 40 may occasionally have air outlets, it is preferably provided that there be no air outlets in the surface, i.e., that the entire vertical extent of the container be impermeable to air.

In the preferred exemplary embodiment illustrated, the direction of air from the blow nozzle 19 aims approximately at the thread guide loop 32, i.e., it is aimed at the upper extent of the outer thread balloon. The exemplary embodiment shown provides a single air nozzle 19 in association with each twisting station 10.

The shroud 15 extends a short distance above and beyond the top end of the protective container 14 and also extends somewhat beyond the turntable 12; its bottom end is completely open. The lateral surfaces of the shroud have no interruptions. The interior wall of the shroud 15, which is rotational symmetric and coaxial with the spindle 11 and the container 14, tapers inwardly beginning with a location 39 which lies somewhat below the center of the protective container; the tapering continues to its open end.

Above the tapering region, the shroud 15 is substantially cylindrical in this preferred embodiment but the cross section may have other suitable shapes.

Furthermore, as illustrated, the protective container may be somewhat curved longitudinally. As shown, there is formed an annular gap of constant width between the protective container and the shroud, the width of the gap being such that substantial amounts of air can pass therethrough without encountering appreciable resistance.

By extending the shroud upwardly beyond the protective container 14, it is insured that all the air entering the protective container 14 from above is such air as emerges substantially from the air nozzle 19 and, possibly, to a small extent from the shroud 15, although that latter air is also still substantially conditioned air, so that all the air included in the protective container 14 and the shroud 15 has the qualities of the air in the inlet channel 16.

The payoff bobbin is disposed in known manner within the protective container 14 and carried thereby so that it does not partake of the rotation of the spindle but remains standing still, together with the protective container. The overall operation of the twisting station need not be discussed in detail since it is well known. The following description will relate only to the novel pneumatic system provided by the invention, wherein the direction of the air flow is indicated in FIG. 1 by arrows.

Inasmuch as the turntable 12, also called a storage disc, rotates at very high speed, it has a tendency to carry along the air adjacent to it and to fling it outwardly by centrifugal force. The air transported outwardly in this manner is guided by the shroud 15 both upwardly and downwardly. Accordingly, the motion of the turntable 12 creates a region of reduced pressure or vacuum at the bottom end of the protective container 14. This reduced pressure causes air from the interior of the protective container 14 to be aspirated through the openings 41 in the bottom of the container 14 so that replacement air continually enters the container 14 from above. In order to insure that the air prevailing in the container 14 has the desired conditions, i.e., that it is air of predetermined humidity and temperature, creating optimum conditions for twisting, the nozzle 19 delivers conditioned air at a sufficiently high velocity so that most of that air enters the interior space of the protective container 14 which is thereby constantly passed by conditioned air flowing from the top to the bottom. The conditioned air emerges from the container through the lower openings 41, flows along the top of the turntable 12 which flings it radially outwardly in the direction of the shroud 15 from which it travels partly upwardly along the interior wall of the shroud 15 and from there emerges into the open space above the twisting station where it creates a region of conditioned air, and a portion of the air travels downwardly along the shroud 15 into the exhaust channel 20. Some of the air traveling upwardly within the shroud 15 is short-circuited and re-enters the protective container 14 while the remainder of the air traveling upwardly through the shroud 15 creates an air curtain which prevents admission of unconditioned ambient air into the blast air stream, at least to the extent that the blast air flow rate need not be very high.

The conditioned air flowing into the exhaust channel 20 is continuously aspirated by a source of reduced pressure 21 and, after suitable processing, may re-enter the air conditioning system after suitable addition of, for example ambient air.

Any heat generated by friction in the drive of the spindles 11 is at least substantially carried away with the exhaust air. In the present exemplary embodiment, such heat is created by friction of the tangential belt 24 against the whorls 23 as well as by friction in the bearings 22 of the spindles 11 and that of the turntable 12, and the thread balloons 26, 27 making contact with surrounding surfaces. In a manner not shown, the drive motor for driving the tangential belt 24 may also be included in the exhaust air channel or connected thereto so that any heat generated by the motor is also continuously carried away and does not become a heat load for the air conditioning system.

All these measures have the result that the space containing the twisting machine can be serviced by an air conditioning system of substantially reduced capacity and thus resulting in great cost savings. The direct individual conditioning of the twisting stations 10 by means of conditioned air emerging from the nozzles 19 results in substantial technological advantages, for example a sharp reduction of the number of thread breakages, etc.

In general, it is advantageous to so arrange the nozzles 19 that the air emerging therefrom travels obliquely with respect to a perpendicular, in the direction of the thread guide loop 32, because the suction created by the turntable 12 and acting through the container 14 is able to aspirate the air from the vicinity of the thread guide loop 32. However, and depending on each particular installation, other suitable directions for the air are possible in order to obtain complete or substantial entrance of the conditioned air into the protective container 14. The transport of the air in the direction of the thread guide loop brings the advantage, among others, that the blown-in air passes through a region of the outer thread balloon 26 in which the thread 27 has relatively low translational velocities so that the passage of the blown-in air through the thread balloon 26 does not influence the shape of the balloon in a detrimental manner. In the same way, the shape of the interior thread balloon 30 is unaffected by the air flowing through the container 14.

Even in situations where the main drive motor for driving the twisting spindles is not cooled by exhaust air, the illustrated exhaust channel 20 carries off 50 to 60% of the heat generated by the machine.

In some cases it may be advantageous to modify the exhaust channel 20 in such a manner that the drive spindles 11 do not extend into it over its entire length but, rather, that the central exhaust channel is so located in or outside of the machine, for example on the floor of the machine room, that there is a tapped off tube leading from each shroud 15 to the exhaust channel 20. Each of these tubes can be attached at the bottom of the associated shroud 15. An exemplary embodiment of this type is shown in dash-dot lines in FIG. 1. The central exhaust channel in that embodiment is designated with the numeral 20'. A separate tube 20" leads from each twisting station 10 to the central exhaust channel 20'. Each tube 20" is penetrated by the drive spindle 11 so that all the whorls 23 and the tangential belt 24 common to all twisting stations lies outside of the exhaust channel 20' and of the tubes 20". The individual twisting stations experience the same high degree of air conditioning but, in this case, a portion of the heat generated by the drive mechanism is free to escape into the atmosphere and is not carried away by the exhaust air, requiring an air conditioning system of greater capacity than would be necessary in the example illustrated in solid lines.

Numerous other embodiments are capable within the scope of the invention. Thus, in many cases, it may be provided that the shroud surrounding the protective container 14 is substantially shorter or that it is covered on top and that air is blown into it, etc. Similarly, it would be possible to provide for the passage of air out of the shroud 15 by openings in its circumference, etc. In some other cases, it may be advantageous not to provide an exhaust air channel but to let the conditioned air escape freely from the shroud at the top and/or the bottom. In some cases, the shroud may be dispensed with altogether so that the outer thread balloon is free to assume any shape, possibly limited by plate-like balloon limiters at two diametrically opposite locations.

The invention also relates to a process for conditioning the air at double twisting stations which is particularly distinguished in that the protective container of the double twisting station is provided with conditioned air which flows through it from top to bottom.

The invention is usable, in principle, for any possible double twisting stations, irrespective of the particular construction, because the double twisting process is unaffected by the system according to the invention. On the contrary, the climate within the twisting station is made more favorable, indeed optimal, so that technological advantages for the twisting process and the thread produced thereby are derived.

It should be noted that it is not the purpose of the air flowing through the protective container or the shroud to limit the extent of the thread balloons. It is, however, an additional advantage of the invention that it keeps the twisting stations clean, although being very simple in construction and very reliable. It is especially well suited for the conditions of double twisting. In many cases, it is also possible to adapt already existing double twisting machines to accomodate the method and structures of this invention.

In a preferred exemplary embodiment, the lateral surface of the shroud is provided with an opening into the exhaust channel. In FIG. 1 these openings are shown as suction slits 45 in dash-dot lines. Through these slits, air is aspirated from the shroud 15, preferably above the protective container 14, so that any small amount of air which flows back from the shroud 15 into the container 14 is further reduced and the overall conditioning improved. In addition, the emergence of dust out of the top of the shroud 15 is substantially reduced or completely eliminated. In any case, the dust has a tendency to migrate to and attach to the interior wall of the shroud 15 due to the rotation and thus to travel through the suction slits 45.

The foregoing relates to preferred exemplary embodiments of the invention, it being understood that other variants and embodiments are possible within the spirit and scope of the invention, the latter being defined by the appended claims.

What is claimed is:

1. In a double twisting machine which includes at least one twisting station, said twisting station having a protective container surrounding a payoff bobbin and a turntable for providing thread rotation, the improvement comprising:
   nozzle means for supplying air to the vicinity of the top of said protective container, said nozzle means being mounted on said twisting station and supplied with air which is pre-conditioned with respect to at least one of the parameters of temperature and humidity; and
   said protective container being provided with an opening in its respective end near said turntable for permitting the flow of at least portions of said pre-conditioned air therethrough.

2. A double twisting machine as defined by claim 1, wherein said opening is located in the bottom portion of said protective container and above said turntable.

3. A double twisting machine as defined by claim 2, wherein each of said at least one twisting stations includes a thread guide loop for defining the topmost extent of the external thread balloon and wherein said nozzle means is inclined to direct its air flow substantially in the direction of said thread guide loop.

4. A double twisting machine as defined by claim 1, the improvement further comprising a shroud mounted on said twisting station so as to substantially surround said protective container and to remain coaxial therewith; and exhaust air means connected to said shroud for carrying away air from said at least one twisting station.

5. A double twisting machine as defined by claim 4, wherein said shroud extends above the top of said protective container in the substantially vertical direction of an operative machine.

6. A double twisting machine as defined by claim 4, wherein said shroud has a lower open end which terminates in said exhaust air means.

7. A double twisting machine as defined by claim 4, wherein said turntable has a downwardly extending drive spindle mounted in bearings permitting rotation and wherein said drive spindle and said bearings are contained within said exhaust air means.

8. A double twisting machine as defined by claim 4, wherein said exhaust air means is an exhaust conduit into which terminate the shrouds of a plurality of twisting stations.

9. A double twisting machine as defined by claim 4, wherein the suction in said exhaust air means is so chosen that only a portion of the air flowing into said shroud from said nozzle means is received in said exhaust air means whereas the remainder of said pre-conditioned air flows upwardly through said shroud into the ambient atmosphere.

10. A double twisting machine as defined by claim 4, wherein the direction of air flow from said nozzle means is oblique with respect to the longitudinal axis of said protective container and is generally directed into a region of reduced pressure prevailing upstream of said protective container.

11. A double twisting machine as defined by claim 4, wherein said shroud extends at least partially into said exhaust air means.

12. A double twisting machine as defined by claim 4, wherein said shroud extends completely into said exhaust air means.

13. A double twisting machine as defined by claim 4 including an opening in the wall of said shroud near its upper end, said opening communicating with said exhaust air means.

14. A method for conditioning the air in the vicinity of double twisting stations comprising the steps of:
   admitting pre-conditioned air to the top of the protective container including the payoff bobbin and to cause said pre-conditioned air to flow through said protective container in the generally downward direction in an operative machine;
   aspirating air continuously from the bottom of said protective container thereby creating a region of reduced pressure on the top of said container; and
   blowing pre-conditioned air into said region of reduced pressure, preferably obliquely with respect to the longitudinal axis of said protective container.

* * * * *